United States Patent [19]
Diamond et al.

[11] Patent Number: 5,836,009
[45] Date of Patent: Nov. 10, 1998

[54] CALLER ID TELEPHONE WITH SIGNAL ATTENUATION

[75] Inventors: Robert Diamond, Bedford, N.Y.; Paul Locklin, San Martin, Calif.; Ron Anglikowski, Morgan Hill, Calif.; Steve Landry, San Jose, Calif.

[73] Assignee: CIDCO Incorporated, Morgan Hill, Calif.

[21] Appl. No.: 653,519

[22] Filed: May 24, 1996

[51] Int. Cl.$^6$ .................................................. H04M 11/00
[52] U.S. Cl. ...................... 379/93.23; 379/142; 379/252; 379/215
[58] Field of Search .................................. 379/96–99, 93, 379/110, 142, 215, 252–256, 389, 390, 395, 420, 409, 433, 432, 93.01, 93.18, 93.17, 93.23, 93.37, 110.01; 375/216; 370/496, 484, 497

[56] References Cited

U.S. PATENT DOCUMENTS

| | | | |
|---|---|---|---|
| 4,955,055 | 9/1990 | Fujisaki et al. | 379/390 |
| 4,982,427 | 1/1991 | Nicolai | 379/390 |
| 5,263,084 | 11/1993 | Chaput et al. | |
| 5,410,541 | 4/1995 | Hotto | 379/97 |
| 5,615,256 | 3/1997 | Yamashita | 379/390 |

*Primary Examiner*—Wing F. Chan
*Attorney, Agent, or Firm*—Skjerven,Morrill,MacPherson, Franklin & Friel LLP; Michael Shenker

[57] ABSTRACT

A telephony call waiting feature is provided wherein a caller ID information related to a third party wishing to converse with a first party already engaged in a conversation with a second party is provided to the first party. When the local office sends an alerting tone (e.g., CAS) to the first party, the first party telephone set responds by attenuating signals going to the first party handset. The local office then transmits the caller ID information relating to the third party and the first party apparatus receives and displays to the first party the caller ID information related to the third party thereby allowing the first party to either accept or reject the waiting call based on the displayed information.

32 Claims, 3 Drawing Sheets

CALLER ID TELEPHONE WITH SIGNAL ATTENUATION

BACKGROUND OF THE INVENTION

The invention relates to telephones, and more particularly to a call-waiting service that includes third party calling number delivery.

The call-waiting (CW) telephony feature is well-known and has been offered by telephone companies. In conventional CW, when a customer who subscribes to the CW service is engaged in a telephone conversation with a second party and a third party calls that customer, the customer receives an alerting signal such as a subscriber access signal (SAS) tone, whereas the third party receives audible ringing. If the CW customer chooses to receive the call from the third party, a switch-hook flash or pressing a selected button on the telephone set holds the second party while the customer's connection is switched to the third party. If the customer ignores the first SAS tone, a second SAS tone is given after a few seconds and if this tone is also ignored, the third party is given a busy tone. Alternatively, the third party continues to receive the ringing tone, and the customer continues to receive the SAS tone, until the customer accepts the call from the third party or the third party hangs up.

When the CW customer receives a SAS tone from the telephone company office, the CW customer may want to identify the third party before making a decision whether the customer should interrupt the existing conversation and connect to the third party. Therefore, the CW service has been combined with the caller ID service to create caller ID call waiting (CIDCW). With the caller ID, the telephone company transmits encoded information to the customer's telephone when a second party is calling the customer. This encoded information (caller ID information) typically includes the name and phone number of the calling party. The telephone customer may purchase or lease customer premises equipment (CPE) which decodes and displays the encoded information before the customer picks up the phone. Some methods and protocols of data transfers for the realization of the caller ID feature are available from Bellcore Technical References TR-TSY-00030 and TR-TSY-00031.

One method for combining CW and caller ID is described in U.S. Pat. No. 5,263,084 issued Nov. 16, 1993 to Chaput et al. According to that patent, when a CW customer receives a call waiting tone, the customer's set mutes the customer's handset for a predetermined interval of time, and the third party caller ID (CID) information is transmitted to the customer during that interval. Muting the handset prevents the customer from hearing the annoying sound which would otherwise be caused by the caller ID information. Muting also prevents the caller ID information from being distorted by the customer's voice.

However, muting the handset is sometimes undesirable. Therefore, it is desirable to provide alternative ways of receiving the caller ID information while still reducing the possibility of a customer being annoyed by the sound of the caller ID information and of the caller ID information being distorted by the customer's voice. It is desirable to provide these advantages on analog subscriber lines using non-ISDN (Integrated Services Digital Network) technology.

SUMMARY

With CIDCW, the telephone office mutes the second party while the third party caller ID information is transmitted to the first party. If the first party does not realize that the first party telephone is muted, the first party may continue to talk to the second party. A misunderstanding may result since the customer does not realize that the second party is not participating in the conversation. The present invention allows alerting the first party that the caller ID information is being transmitted.

More particularly, in some embodiments of the invention, when the caller ID information is being transmitted to a CIDCW customer, the customer's earpiece is not muted. The sound caused by the caller ID information alerts the customer that the information is being transmitted and that the conversation with the second party is interrupted. In some embodiments, to make this sound less annoying to the customer, the sound is attenuated.

In some embodiments, the customer can control the amount of sound attenuation. In some embodiments, the customer can set the attenuation amount by a specially provided switch.

In some embodiments, the customer's microphone is muted when the caller ID information is transmitted. Thus, the caller ID information is not contaminated with the customer's voice.

DESCRIPTION OF PREFERRED EMBODIMENTS

Figure 1:
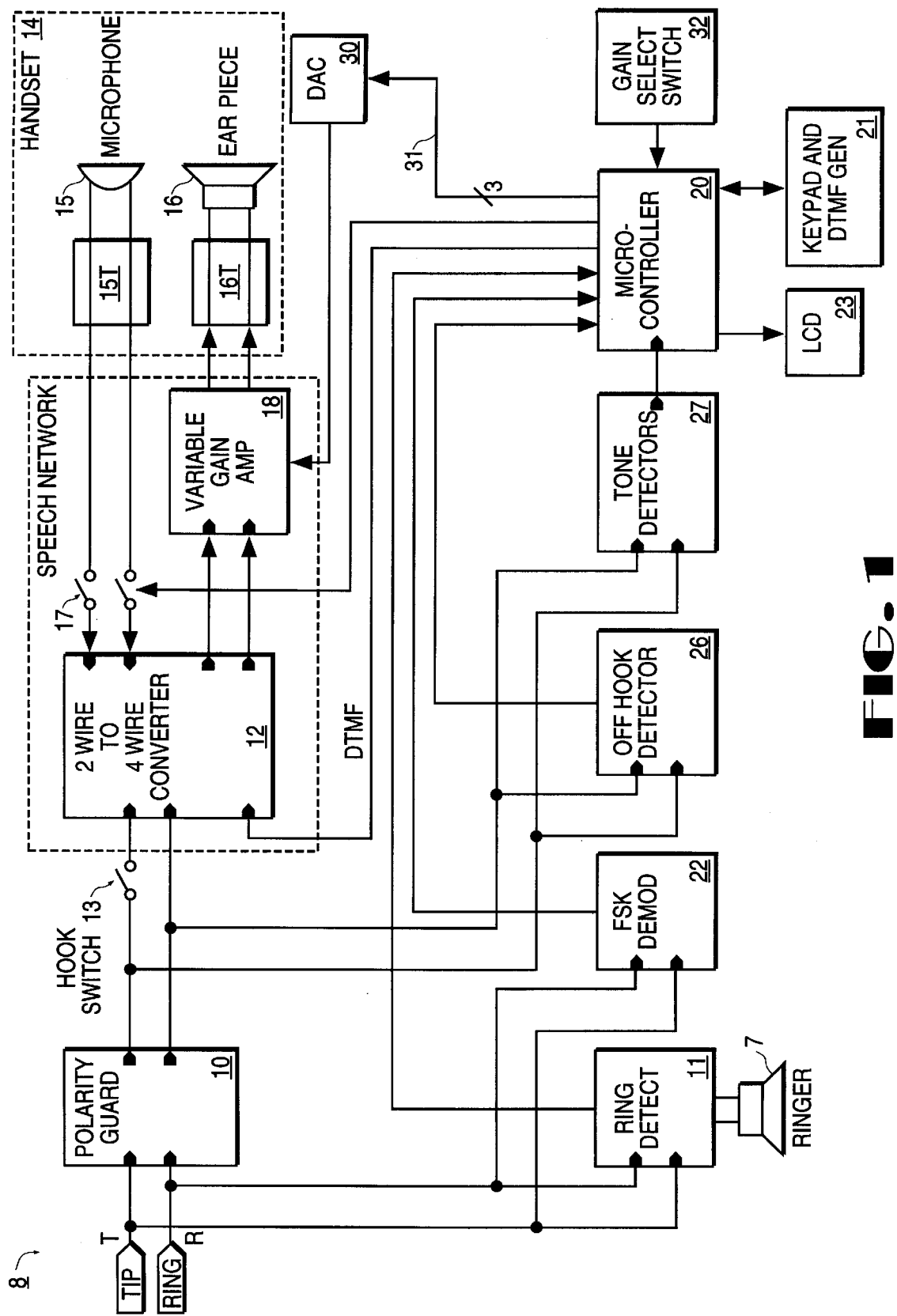
FIG. 1 is a block diagram of a telephone subscriber set in accordance with the invention.

FIG. 1 is a block diagram of a portion of a subscriber set 8. The tip and ring leads of the subscriber loop extend from the set 8 to a local telephone switching office (not shown). The tip and ring leads are connected to the polarity guard circuit 10 and to ring detect circuit 11 that is used to provide visual and/or audible alerting signals to the subscriber when a call has arrived. The audible signals are provided by ringer 7 connected to circuit 11. Polarity guard circuit 10 is also connected to a 2 wire/4 wire hybrid circuit 12 via a hook-switch 13. The hybrid circuit 12 is connected to a handset 14 comprising microphone 15 and earpiece 16. In FIG. 1, hybrid circuit 12 is connected to microphone 15 and earpiece 16 via respective switch 17 and variable attenuator 18. The 2 wire/4 wire circuit 12, switch 17 and attenuator 18 form a speech network. Attenuator 18 is a variable gain amplifier. In some embodiments, amplifier 18 is built using a conventional operational amplifier such as LM328 or LM324, and also using additional parts providing the variable gain capability, as is known in the amplifier art. The inverting and non-inverting inputs of amplifier 18 are connected to 2 wire/4 wire converter 12. The direct and inverted outputs of amplifier 18 are connected to earpiece 16 through transmit transducer 16T. The gain control input of amplifier 18 is connected to an output of digital-to-analog converter 30. The input of DAC 30 is a three-bit line 31 connected to an output of a control circuit which is microcontroller 20. In some embodiments, microcontroller 20 is of type Signetics PCD-3348, Intel 8051, or Fujitsu 88543. Microcontroller 20 generates on line 31 a digital signal indicative of the position of gain selector switch 32 whose output is connected to an input of microcontroller 20. In some embodiments, switch 32 is a user-controllable slide switch having a suitable number of discrete positions. In some embodiments, switch 32 is potentiometer which is part of attenuator 18.

Switch 17 is connected to microphone 15 through receive transducer 15T. The control input of switch 17 is connected to an output of microcontroller 20.

Microcontroller 20 is connected to a conventional keypad and DTMF (Dual-Tone Multifrequency) generator 21 and an FSK (Frequency Shift Keying) demodulator circuit 22. In some embodiments, FSK circuit 22 is model XR2211 manufactured by the Exar Corporation. The microcontroller 20 is also connected to a conventional LCD display 23 such as described, for example, in U.S. Pat. No. 5,263,084 issued Nov. 16, 1993 to Chaput et al. and hereby incorporated herein by reference.

Also connected to the microcontroller 20 and the tip and ring leads are off-hook detector circuit 26 and dual tone detector circuit 27. The off-hook detector 26 functions to provide an output signal that indicates whether or not the subscriber set 8 is connected with an off-hook extension set. More particularly, to determine whether the set 8 is connected with an off-hook extension set, microcontroller 20 opens the hookswitch 13 for a short period of time, then closes the switch. When switch 13 is open, detector 26 detects whether the voltage across the tip and ring lines rises. If the voltage rose, detector 26 signals microcontroller 20 that no off-hook sets are connected.

The tone detector 27 is suitable to detect the presence of a CPE alerting signal (such as a CAS tone) in the presence of voice signals on the subscriber loop.

Microcontroller 20 functions as a control hub of the subscriber set by responding to signals from the ring detect circuit 11, the circuits 22, 26, 27 and hookswitch 13 and by providing control signals to switch 17, attenuator 18, DTMF generator 21 and display 23.

Figure 2:
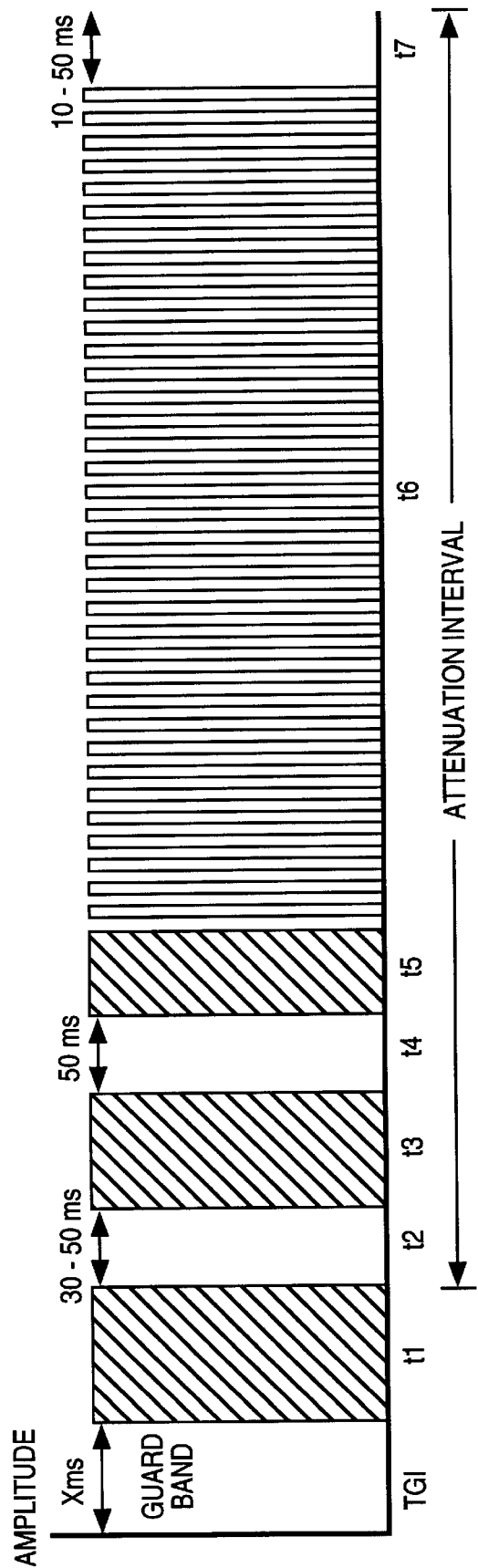
FIG. 2 is a waveform diagram illustrating the sequence of operations of the method of the invention.

The operation of the circuit will be explained using FIG. 2. It will be assumed that a first subscriber associated with the apparatus of FIG. 1 is conversing with a second subscriber via a local central office and that a third party is attempting to reach the first subscriber. Switch 17 is closed. The gain control signal generated by microcontroller 20 on output 31 causes attenuator 18 to have a unity power gain irrespective of the position of gain selector switch 32.

On detecting the incoming call from the third party, the central office prepares to enter the off-hook call waiting procedure of this invention. This is represented by the Xms (x milliseconds) guard band TG1 in FIG. 2. During this period, the call processor of the central office enters a call processing software program associated with the CIDCW feature. The program causes the central office to transmit a predetermined alerting signal. In some embodiments, this signal is a dual-tone signal, for example, a CAS tone, having a predetermined duration t1 (e.g. 80 milliseconds). A single tone signal may be used but is difficult to detect reliably in the presence of voice signals. In some embodiments, the alerting signal is a sequence of a SAS tone followed by a CAS tone. The SAS and CAS tones are described in U.S. patent application Ser. No. 08/387,666 filed Feb. 13, 1996 by M. T. Mathews and hereby incorporated herein by reference.

During the t1 period, the dual-tone detector 27 detects the presence of the alerting signal such as the CAS tone, and provides a corresponding signal to microcontroller 20. At this point, the microcontroller 20 in the subscriber set 8 is aware of the off-hook status of the set 8. Using off-hook detector 26, microcontroller 20 checks the off-hook status of any extension set(s) connected to set 8. If no extension sets are off-hook, microcontroller 20 prepares to send an acknowledgement signal. More particularly, microcontroller 20 opens the switch 17 to mute the microphone 15 and reduces the gain of operational amplifier 18 to attenuate the signals going to earpiece 16. In particular, the gain control signal on output 31 changes to a value corresponding to the position of gain selector switch 32. The resulting gain of amplifier 18 is in the range from 0 (which corresponds to muting earpiece 16) to 100% (no attenuation). In some embodiments the gain has a value of 1%, 5%, 20%, 50, or some other suitable value depending on the position of switch 32. In some embodiments, the gain value of 0 (muting) is not provided, and the minimal gain of attenuator 18 is 1%, or 5%, or 50%, or some other suitable value to allow the user to hear the CID information.

In some embodiments, gain selector switch 32 is not provided, and microcontroller 20 sets the gain of amplifier 18 to some value greater than zero and less than 100%, for example, to 1%, 5%, 20%, 50%, or some other suitable value, to allow the customer to hear the sound of the caller ID information while making the sound less annoying (or not annoying at all) to the customer.

Microcontroller 20 now signals the DTMF generator 21 to generate an acknowledgement signal t3 (CAS ACK) on the subscriber loop to inform the central office that it is a subscriber set capable of receiving caller ID information. Without this signal, the central office would always send the modem data burst to the annoyance of subscribers using sets without attenuator 18. In the case that an extension set is off-hook, the microcontroller 20 will prevent the acknowledgement signal from being transmitted by not causing it to be generated, thus causing the data transmission sequence at the central office to be terminated. Without the use of this control mechanism, the subscriber on the extension set would hear the modem burst and the control tones and its voice may mutilate the modem data on the subscriber loop. The acknowledgement tone is transmitted in a very quiet period on the subscriber loop since the first subscriber's microphone has been muted by its own set 8 and the second subscriber has been muted by the central office in the manner conventional for a call-waiting process. Almost any tone could therefore be specified as an acknowledgement tone. In some embodiments, a DTMF signal is used since it is not easily duplicated by random events or voice signals. DTMF signal "D" is typically used.

During the t4 period which lasts about 50 milliseconds in some embodiments, the set 8 prepares to receive data and the central office prepares to transmit the data. Periods t5 and t6 represent the data transmission itself. The signalling method, format and definition of the messages and parameters are defined in the aforementioned TR-TSY-30 standard incorporated herein by reference. The standards requirement of a channel seizure tone is not required since the subscriber set 8 is ready to receive. The t5 portion thus consists of at least 80 milliseconds (e.g. 150 ms) of logical 1 data to condition the FSK demodulator 22 for receiving the ensuing data which has a period t6. In some embodiments, the period t6 is a variable period dependent on the amount of data transmitted. In other embodiments, t6 is a fixed period dependent on the amount of data transmitted typically. This data may correspond to the third party telephone number, name, date, time of day, etc. The FSK data is received by the FSK demodulator 22 which translates it to a digital bit stream that is fed to the microcontroller 20 which translates the data into information displayed on the display 23. Unless the gain of attenuator 18 is 0 or so low that the earpiece 16 is completely muted, the subscriber hears the caller ID transmission. The sound generated by the caller ID alerts the subscriber that the conversation with the second party is interrupted.

During a short interval t7, the circuits at both ends prepare to resume normal operation. In particular, microcontroller 20 closes switch 17 and restores the gain of amplifier 18 to unity. Then the conversation may resume.

When the caller ID has been displayed on display 23, the subscriber is in a position to decide whether or not to accept the waiting call based on the identity of the caller. Acceptance of the waiting call simply entails generating a hook-switch flash in the conventional manner, or pressing a special button (not shown) on the set 8, whereas rejection of the waiting call is achieved by ignoring it. If the subscriber ignores the waiting call, the central office may generate a second SAS, CAS sequence after a predetermined period. However, the caller ID information is not retransmitted unless the first transmission was not correctly received. In that case, the acknowledgement tone t3 would be generated but would not be generated otherwise.

The time periods discussed vary from embodiment to embodiment.

In some embodiments, set 8 is modified to receive caller ID information even in the presence of off hook extension sets. In such embodiments, set 8 and the extension sets possess the multiple extension capability (MEC) described, for example, in U.S. patent application Ser. No. 08/388,108 filed Feb. 13, 1995 by Harry W. Lewis and entitled "Caller ID and Call Waiting for Multiple CPEs on a Single Telephone Line". Application Ser. No. 08/388,108 is hereby incorporated herein by reference. Application Ser. No. 08/388,108 describes a system allowing a plurality of CPEs on a single telephone line to receive and display a third party's caller ID information. Such CPEs are referred to therein as CCPEs for conforming CPEs.

According to one embodiment described therein, one CCPE of the plurality of CCPEs is a primary CCPE, whereas the remaining CCPE(s) are secondary CCPE(s). While the users are communicating with the second party using any one or more of the CCPEs, each CCPE detects whether a CAS tone has been transmitted by the central office, thereby detecting when the third party is calling. Each CCPE responds by disconnecting the CCPE's telephone from the telephone line.

After all of the CCPEs are on-hook, the primary CCPE then goes off-hook and transmits a CAS acknowledgement ("CAS ACK") signal to the central office. All of the CCPEs then wait for the central office to transmit the CID (caller ID) information in response to the CAS ACK signal.

After the CID information is received by the CCPEs, the CCPEs then reconnect the telephone line to the house telephone of the CCPE and then the primary CCPE goes on-hook. Each CCPE displays the caller information.

Another embodiment described therein allows for using conventional CPEs (hereinafter referred to as "NCPEs" for non-conforming CPEs) on the phone line along with CCPEs. Each CCPE detects whether a CAS tone has been sent by the central office. Upon detection of a CAS tone, each CCPE disconnects the CCPE's telephone from the telephone line and goes on-hook. Each CCPE then detects if any NCPE is off-hook.

When no off-hook NCPE is detected, the primary CCPE goes off-hook and transmits the CAS ACK signal to the central office and waits for the central office to respond with the CID information. The secondary CCPEs remain on-hook and wait for the CID information. The central office responds to the CAS ACK signal by transmitting the CID information, which the CCPEs then display. Each CCPE then reconnects the CCPE's telephone to the telephone line. Thus, each CCPE of the plurality of CCPEs coupled to the single telephone line displays the CID information, even if the users are communicating with the second party on secondary CCPEs.

On the other hand, when an off-hook NCPE is detected, the primary CCPE does not go off-hook to transmit the CAS ACK signal and each CCPE reconnects the CCPE's house telephone to the telephone line and returns to monitoring for a CAS tone. As a result, the central office does not transmit the CID information for display.

A primary CCPE is determined using an arbitration procedure described therein.

If set 8 is a primary CCPE, and set 8 detects no off hook NCPEs when a CAS tone is received, set 8 opens switch 17, sets the gain of attenuator 18 in accordance with the position of switch 32, and then transmits the CAS ACK signal as described above. After the caller ID is displayed, set 8 closes the switch 17 and restores the gain of attenuator 18 to unity. If set 8 detects an off hook NCPE upon receipt of a CAS tone, set 8 keeps switch 17 closed and the gain of attenuator 18 at unity, and does not transmit the CAS ACK signal.

Figure 3:
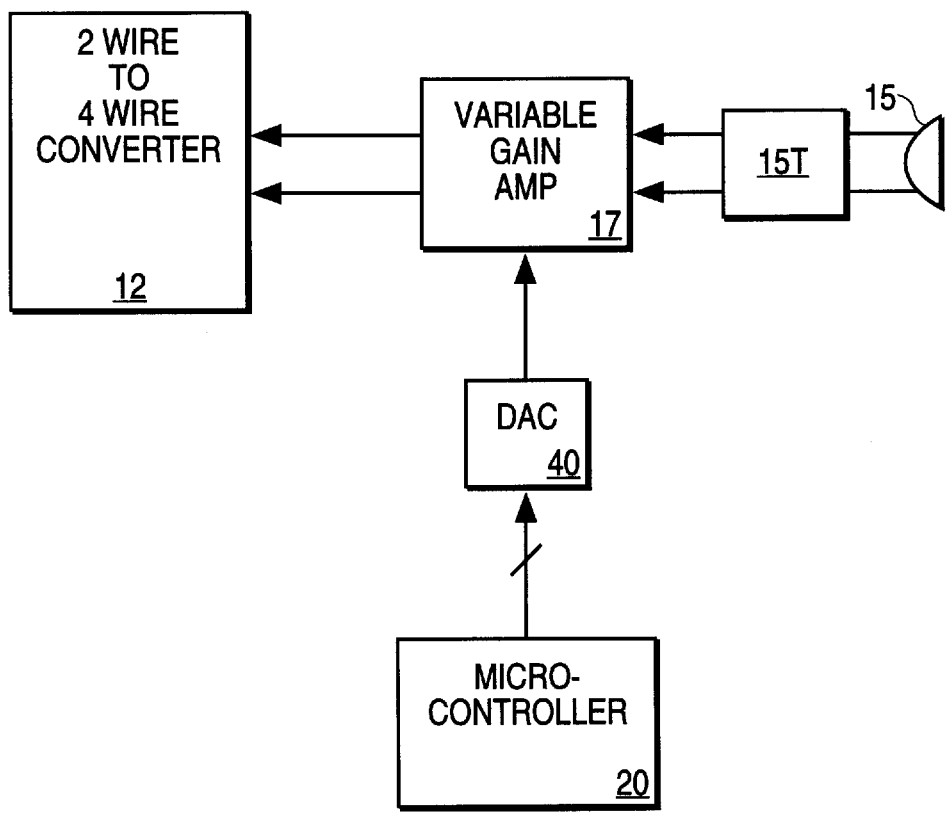
FIG. 3 is a block diagram of a portion of another telephone set in accordance with the invention.

FIG. 3 shows a portion of another embodiment of set 8. In FIG. 3, switch 17 is replaced by an attenuator which is a variable gain amplifier. In some embodiments, amplifier 17 is similar to amplifier 18 (FIG. 2). The inverting and non-inverting inputs of attenuator 17 are connected to transmit transducer 15T. The direct and inverted outputs of attenuator 17 are connected to inputs of 2 wire/4 wire converter 12. The gain control input of attenuator 17 is connected to an output of DAC 40 whose input is connected to an output of microcontroller 20. The rest of set 8 is similar to the embodiment of FIG. 1.

During normal operation, microcontroller 20 causes the amplifier 17 to have a unity gain. When the gain of amplifier 18 is reduced, the gain of amplifier 17 is also reduced by some amount greater than zero and less than 100%. Reducing the gain of attenuator 17 reduces the possibility that the customer's voice will contaminate the CID information when the information is transmitted to set 8. If the gain of amplifier 18 is greater than zero so that the customer hears the CID transmission, the customer is alerted that the CID is being transmitted, and thus the customer is less likely to speak during the CID transmission. Hence, muting the microphone 15 as done in FIG. 1 is unnecessary, and attenuation of the microphone signal by attenuator 17 is sufficient.

In some embodiments, the signal on the input of DAC 40 during the caller ID information transmission is controlled by a user controlled switch (not shown) similar to switch 32.

In some embodiments, DAC 40 is absent, and the gain control input of attenuator 17 is connected to the output of DAC 30.

In some embodiments, to provide an additional signal to the customer that the CID information is being transmitted, set 8 includes a visual indicator, controlled by microcontroller 20, which is activated and deactivated at the same time as the attenuation signal on line 31.

In some embodiments, attenuator 17 is absent, and transmit transducer 15T is connected directly to 2 wire/4 wire converter 12.

Although the invention was discussed using a subscriber set into which the attenuation circuitry is integrated, in another embodiment attenuation is obtained with an adjunct display box containing the described circuitry properly connected to a conventional telephone set.

Numerous other modifications, variations and adaptations may be made to the described embodiments without departing from the scope of the invention. The invention is defined in the claims.

What is claimed is:

1. A method of providing to a first party already engaged in a conversation with a second party, caller ID information related to a third party wishing to converse with said first party, the method comprising the steps of:

sending to the first party a caller ID information signal representing the caller ID information related to said third party; and a first party apparatus receiving the caller ID information signal and displaying to the first party said caller ID information, the first party apparatus also attenuating but not muting the caller ID information signal and providing the attenuated non-muted signal to a handset associated with the first party apparatus.

2. The method of claim 1 further comprising:

sending an alerting signal to the first party prior to sending the caller ID information signal;

the first party apparatus responding to the alerting signal by attenuating, but not muting, the signals going to its associated handset for a first interval of time, wherein the caller ID information signal is received by the first party apparatus during said first interval of time.

3. The method of claim 2 wherein the first interval of time is a variable interval determined by the length of the caller ID information related to the third party.

4. The method of claim 2 wherein the first interval of time is a predetermined fixed interval.

5. The method of claim 2 further comprising the first party apparatus responding to the alerting signal by sending an acknowledgment signal indicating that the first party apparatus is capable of receiving caller ID information, the acknowledgment signal being sent before sending to the first party the caller ID information signal.

6. The method of claim 5 wherein said acknowledgment signal is transmitted only if any extension apparatus associated with the first party apparatus is not off-hook.

7. The method of claim 6 wherein the alerting signal is a dual-tone signal.

8. The method of claim 6 wherein the acknowledgement signal is a dual-tone signal.

9. The method of claim 7 including, in the instance that the first party has not accepted the call from the third party, transmitting a second alerting signal to the first party but the first party transmits a second acknowledgment signal in response to the second alerting signal only if the third party caller ID information was not correctly received following the first alerting signal.

10. The method of claim 5 further comprising the first party apparatus attenuating but not muting the acknowledgment signal and providing the attenuated acknowledgment signal to the handset associated with the first party apparatus.

11. The method of claim 2 wherein the first party apparatus receives the caller ID information related to the third party during the first time interval.

12. The method of claim 2 wherein the first party apparatus responds to the alerting signal also by muting the signals going from its associated handset.

13. The method of claim 1 further comprising making the attenuated caller ID information signal audible by the first party apparatus.

14. A subscriber telephone apparatus for receiving third party caller ID information while a first party associated with the telephone apparatus is conversing with a second party, the apparatus comprising:

an attenuator operable to attenuate without muting a caller ID information signal to provide the attenuated non-muted caller ID information signal to a receive transducer of the telephone apparatus; and means for receiving the caller ID information signal and displaying said third party caller ID information.

15. The apparatus of claim 14 wherein the attenuator is for attenuating the caller ID information signal in response to an alerting signal received by the apparatus.

16. The apparatus of claim 15 further comprising a circuit for generating an acknowledgment signal in response to the alerting signal to indicate that the telephone apparatus is capable of receiving data corresponding to the third party caller ID information.

17. The apparatus of claim 16 wherein the attenuator is operable to attenuate without muting the acknowledgment signal to provide the attenuated acknowledgment signal to the receive transducer of the telephone apparatus.

18. The apparatus of claim 6 further comprising a circuit responsive to the detection of the alerting signal to mute a transmit transducer of the telephone apparatus.

19. The apparatus of claim 16 wherein in response to the detection of the alerting signal the attenuator attenuates the signals going to the receive transducer for a variable time interval dependent on the length of the third party caller ID information.

20. The apparatus of claim 16 wherein in response to the detection of the alerting signal the attenuator attenuates the signals going to the receive transducer of said telephone apparatus for a predetermined fixed interval of time.

21. The apparatus of claim 14 wherein the telephone apparatus is operable to make audible the attenuated caller ID information signal.

22. The apparatus of claim 21 further comprising an off-hook detector, the control circuit being responsive to a signal corresponding to an extension set being off-hook from the off-hook detector, for preventing the generation of said acknowledgment signal.

23. The apparatus of claim 14 wherein the attenuator comprises a variable gain amplifier for attenuating signal going to the receive transducer.

24. The apparatus of claim 14 wherein the attenuator is alternatively operable to mute the caller ID information signal to block the caller ID information signal from the receive transducer.

25. The apparatus of claim 14 wherein the attenuator is incapable of muting the caller ID information signal.

26. The method of providing to a first party already engaged in a conversation with a second party, caller ID information related to the third party wishing to converse with said first party, the method comprising the steps of:

sending to the first party a caller ID information signal representing the caller ID information related to said third party;

a first party apparatus receiving the caller ID information signal and displaying to the first party said caller ID information signal;

providing the caller ID information signal to a variable gain amplifier capable of attenuating the signal without muting the signal; and providing the output of the variable gain amplifier to a receive transducer associated with the first party apparatus.

27. The method of claim 26 wherein the gain of the variable gain amplifier is responsive to a signal to be set at either 0 or to any one of one or more positive values, wherein at least one of the positive values is less than 1.

28. The method of claim 26 wherein the gain of the variable gain amplifier is adjustable to make the caller ID information signal audible to the first party.

29. A method of providing to first party already engaged in a conversation with a second party caller ID information related to a third party wishing to converse with said first party, the method comprising the steps of:

sending an alerting signal to the first party;

a first party apparatus responding to the alerting signal by sending an acknowledgment signal indicating that the first party apparatus is capable of receiving caller ID information, the first party apparatus attenuating but not muting the acknowledgment signal and providing the attenuated non-muted acknowledgment signal to a receive transducer associated with the first party apparatus; and sending to the first party a caller ID information signal representing the caller ID information related to said third party.

30. The method of claim 29 further comprising making the attenuated non-muted acknowledgment signal audible by the first party apparatus.

31. A subscriber telephone apparatus for receiving third party caller ID information while a first party associated with the telephone apparatus is conversing with a second party, the apparatus comprising:

a detector for detecting the presence of an alerting signal in the presence of voice signals;

a circuit responsive to the detection of the alerting signal for producing an acknowledgment signal to indicate that the telephone apparatus is capable of receiving caller ID information; and an attenuator operable to attenuate without muting the acknowledgment signal to provide the attenuated non-muted acknowledgment signal to a receive transducer of the telephone apparatus.

32. The apparatus of claim 31 wherein the apparatus is operable to make audible the attenuated non-muted acknowledgment signal.

* * * * *